United States Patent
Holman et al.

(10) Patent No.: US 9,458,966 B2
(45) Date of Patent: Oct. 4, 2016

(54) LUBRICATION SYSTEM AUTOMATIC SHUTOFF

(71) Applicant: Graco Minnesota Inc., Minneapolis, MN (US)

(72) Inventors: John C. Holman, Ham Lake, MN (US); Andrew J. Klaphake, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/909,639

(22) PCT Filed: Aug. 7, 2014

(86) PCT No.: PCT/US2014/050113
§ 371 (c)(1),
(2) Date: Feb. 2, 2016

(87) PCT Pub. No.: WO2015/021260
PCT Pub. Date: Feb. 12, 2015

(65) Prior Publication Data
US 2016/0169448 A1  Jun. 16, 2016

Related U.S. Application Data

(60) Provisional application No. 61/863,334, filed on Aug. 7, 2013.

(51) Int. Cl.
*F16N 23/00* (2006.01)
*F16N 37/00* (2006.01)
(Continued)

(52) U.S. Cl.
CPC ............... *F16N 37/00* (2013.01); *F04B 17/03* (2013.01); *F04B 49/06* (2013.01); *F04B 49/065* (2013.01); *F04B 53/18* (2013.01); *F16N 19/003* (2013.01); *F16N 31/02* (2013.01); *F04B 2203/0201* (2013.01); *F16N 2037/006* (2013.01)

(58) Field of Classification Search
CPC ...... F16N 19/003; F16N 23/00; F16N 29/04; F04B 7/04; F04B 17/03
See application file for complete search history.

(56) References Cited

U.S. PATENT DOCUMENTS 2,877,796 A * 3/1959 Abdo ................. G05D 16/10
137/594
4,351,283 A * 9/1982 Ament ............... F02M 41/1411
123/458

(Continued)

OTHER PUBLICATIONS

International Search Report and Written Opinion from PCT Application Serial No. PCT/US2014/050113, dated Nov. 19, 2014, 9 pages.

*Primary Examiner* — Emmanuel M Marcelo
(74) *Attorney, Agent, or Firm* — Kinney & Lange, P.A.

(57) ABSTRACT

A lubrication system comprises a lubricant reservoir, a inlet into the lubricant reservoir, a diaphragm plate, an actuator pin, a refill inlet, a refill outlet, and a shutoff valve. The diaphragm plate is disposed at a topmost location within the lubricant reservoir. The actuator pin is coupled to the diaphragm plate such that filling the lubricant reservoir drives the actuator pin from a first position to a second position. The refill inlet is configured to receive lubricant, and the refill outlet is fluidly connected to the inlet of the lubricant reservoir. The shutoff valve is connected between the refill inlet and the refill outlet, and actuated by the actuator pin so as to fluidly connect the refill inlet and refill outlet when the actuator pin is in the first position, and fluidly isolate the refill inlet from the refill outlet when the actuator pin is in the second position.

15 Claims, 5 Drawing Sheets

(51) Int. Cl.

| | |
|---|---|
| *F04B 49/06* | (2006.01) |
| *F04B 53/18* | (2006.01) |
| *F04B 17/03* | (2006.01) |
| *F16N 19/00* | (2006.01) |
| *F16N 31/02* | (2006.01) |

(56) References Cited

U.S. PATENT DOCUMENTS

| | | |
|---|---|---|
| 7,313,956 B1 | 1/2008 | Murphy, Sr. |
| 2002/0125074 A1 | 9/2002 | Roehrborn |
| 2003/0140966 A1* | 7/2003 | Kempf .............. E03B 7/045 137/337 |
| 2003/0213132 A1* | 11/2003 | Frazer .............. A01G 3/02 30/123 |
| 2005/0217737 A1* | 10/2005 | Arigoni .............. E03D 1/32 137/624.14 |
| 2007/0289994 A1 | 12/2007 | Kotyk |
| 2009/0078507 A1 | 3/2009 | Gaugush et al. |
| 2010/0129548 A1* | 5/2010 | Sneh .............. C23C 16/4409 427/248.1 |

\* cited by examiner

LUBRICATION SYSTEM AUTOMATIC SHUTOFF

INCORPORATION BY REFERENCE

U.S. provisional application No. 61/863,334 is hereby incorporated by reference in its entirety.

BACKGROUND

The present invention relates generally to lubrication systems. More particularly, the invention relates to an automatic refill shutoff subsystem for a mobile lubrication system.

Industrial and construction machinery often requires lubrication to function. Seals, pistons, and bearings of such machinery may require substantial volumes of grease, oil, or other lubricant to protect against wear, prevent corrosion, and/or reduce frictional heating. Mobile machinery is often incorporated into or transported by industrial vehicles, which commonly use portable local lubrication assemblies wherein local lubricant pumps, reservoirs, and injectors are affixed vehicles or devices to ensure adequate lubrication. Local reservoirs have limited capacity sufficient to handle extended ordinary operation, and are refilled with lubricant from a larger source, as needed. Local lubrication assemblies often supply lubricant to multiple lubricant injectors dedicated to different machinery.

SUMMARY

A lubrication system comprises a lubricant reservoir, an inlet into the lubricant reservoir, a diaphragm plate, an actuator pin, a refill inlet, a refill outlet, and a shutoff valve. The diaphragm plate is disposed at a topmost location within the lubricant reservoir. The actuator pin is coupled to the diaphragm plate such that filling the lubricant reservoir forces the diaphragm plate upward, driving the actuator pin from a first position corresponding to an unfilled reservoir state to a second position corresponding to a filled reservoir state. The refill inlet is configured to receive lubricant, and the refill outlet is fluidly connected to the inlet of the lubricant reservoir. The shutoff valve is connected between the refill inlet and the refill outlet, and actuated by the actuator pin so as to fluidly connect the refill inlet and refill outlet when the actuator pin is in the first position, and fluidly isolate the refill inlet from the refill outlet when the actuator pin is in the second position.

In a second embodiment, an inlet shutoff assembly for a lubrication reservoir comprises a diaphragm plate, an actuator pin, an inlet shutoff valve, and an indicator pin. The diaphragm plate is disposed at a topmost location within the lubricant reservoir. The actuator pin is coupled to the diaphragm plate such that filling the lubricant reservoir forces the diaphragm plate upward, driving the actuator pin from a first position corresponding to an unfilled reservoir state to a second position corresponding to a filled reservoir state. The inlet shutoff valve is actuated by the actuator pin so as to be open when the actuator pin is in the first position to allow flow to the lubricant reservoir, and closed when the actuator pin is in the second position to prevent flow. The indicator pin is visible when the actuator pin is in the second position, but hidden when the actuator pin is in the first position.

DETAILED DESCRIPTION

The lubrication system of the present invention includes a shutoff valve assembly that automatically terminates lubricant flow into a lubricant reservoir during refilling operations, once the lubricant reservoir is full.

Figure 1:
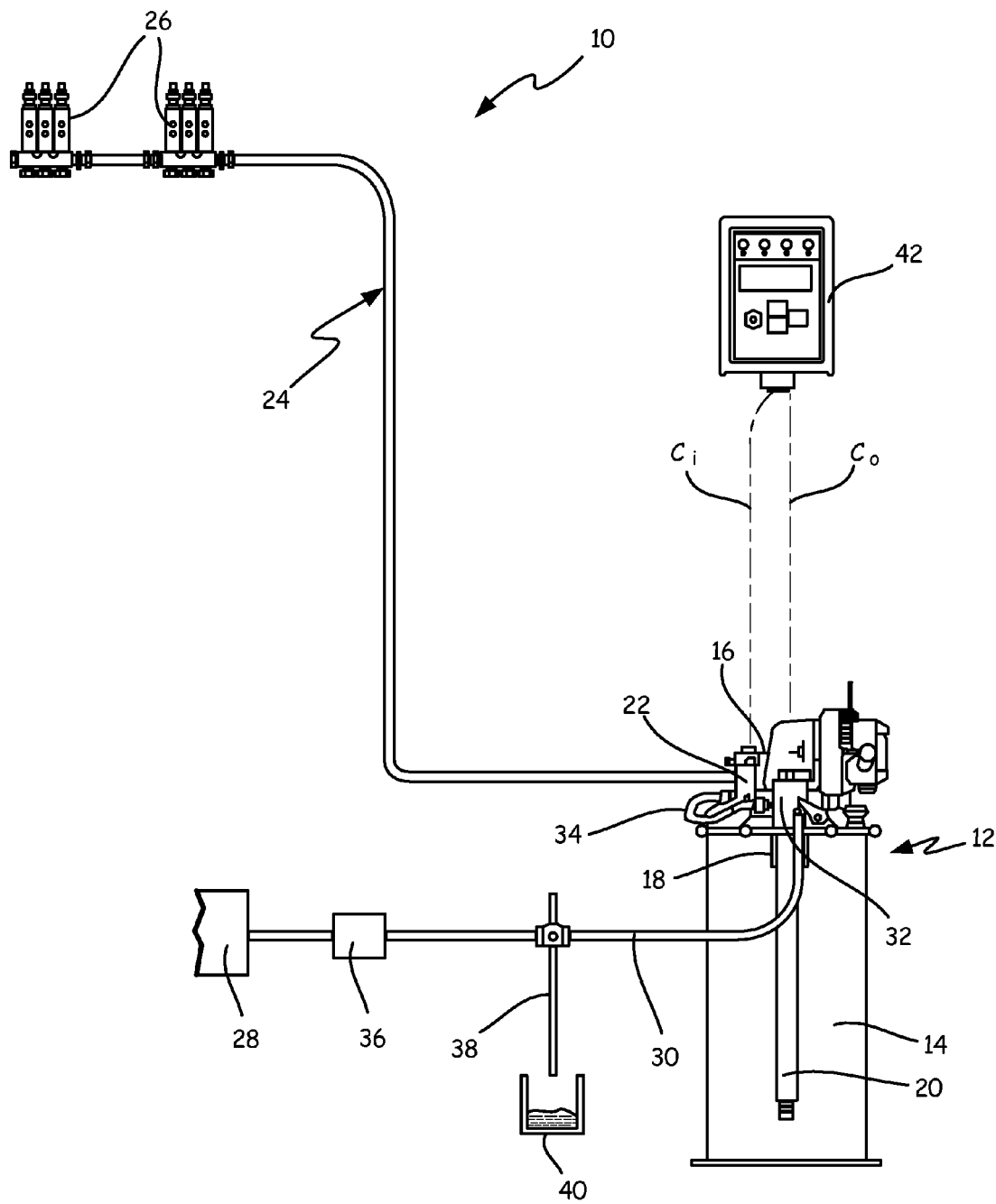
FIG. 1 is a schematic view of a lubrication system.

FIG. 1 is a schematic diagram of lubrication system 10, a system that receives, stores, and supplies lubricant fluid. Lubrication system 10 comprises local assembly 12 with lubricant reservoir 14, motor 16, pump 18, fluid tube 20, input/output manifold 22, lubricant work line 24, and lubricant injectors 26. Lubricant fluid from refill source 28 can be supplied to lubricant reservoir 14 via refill line 30, shutoff valve assembly 32, and reservoir inlet line 34. Refill pump 36 pressurized fluid from refill source 28, and dump line 38 can drain excess lubricant from refill line 30 into lubricant dump 40.

Local assembly 12 is a dedicated lubrication assembly for use with lubricated machinery such as pumps, pistons, seals, bearings, and/or shafts. Local assembly 12 can, for example, be a lubrication assembly mounted on a vehicle or other mobile device for lubrication of mobile components. Lubricant reservoir 14 is a tank or other container for lubricant fluid. In some embodiments, lubricant reservoir 14 can be a substantially cylindrical drum. Motor 16 drives pump 18, which in turn draws lubricant from lubricant reservoir 14 through fluid tube 20, and forces lubricant into lubricant work line 24 through input/output manifold 22, under pressure. Motor 16 can, for example, be an electrical or pneumatic motor. In one embodiment pump 18 is a piston pump. In alternative embodiments, pump 18 can be a reciprocating pump of any other kind, or a gear pump.

Fluid tube 20 is a lubricant-carrying tube that extends from a top location of lubricant reservoir 14 near input/output assembly 22 to bottom location near the base of lubricant reservoir 14. Although fluid tube 20 is depicted as a vertical cylindrical tube, alternative embodiments can bend, be angled, or otherwise have other shapes. Fluid tube 20 can, for example, be a nested tube with concentric inlet and outlet channels. Inlet/outlet manifold 22 provides the entrance and exit for lubricant into or from lubricant reservoir 14. Inlet/output manifold 22 connects to fluid tube 20, lubricant work line 24, and inlet line 34. Lubricant work line 24 is a fluid distribution line that carries lubricant from input/output manifold 22 to lubricant injectors 26, which can be distributed across a plurality of lubricated components (not shown). Although only one lubricant work line 24 is shown, some embodiments of local assembly 12 can comprise multiple lubricant work lines, all connected to input/output manifold 22. Lubricant injectors 26 are injectors for grease, oil, or other lubricant materials that are disposed at the locations of lubricated components. Lubricant injectors 26 can, for example, be spring-biased injectors pressurized by motor 18 that fire to supply a metered quantity of lubricant fluid.

Refill source 28 is a source of lubricant material used to refill lubricant reservoir 14, as needed. Refill source 28 can, for example, be a large stationary drum, tank, or container. When lubricant reservoir 14 is depleted, it can be refilled by attaching refill line 30 to shutoff valve assembly 32, which is fluidly connected to input/output manifold 22 via inlet line 34. Refill line 30 can, for example, be a detachable hose associated with refill source 28. Shutoff valve assembly 32 is a valve assembly disposed between refill source 28 and inlet/output manifold 22. Shutoff valve assembly 32 is biased open, but closes when lubricant reservoir 14 is full, preventing overfilling. When shutoff valve assembly 32 is open, fluid from refill source 28 can be pumped through refill line 30, shutoff valve assembly 32, and inlet line 34 into lubricant reservoir 14 by refill pump 36. Refill pump 36 can, for example, be a gear pump, a reciprocating cylinder pump, or any other appropriate pressurizing device. Once lubricant reservoir 14 has been filled, refill line 30 can be disconnected from shutoff valve assembly 32. Excess lubricant can be exhausted from refill line 30 via dump line 38. Dump line 38 can, for example, be an outlet line or spigot attached to refill line via a manually actuated valve. In some embodiments lubricant dump, can be a waste fluid dump. In other embodiments, lubricant dump 40 can be a recirculation dump that routes excess lubricant back to refill source 28.

Lubrication controller 42 is a logic-capable device such as a dedicated microprocessor or collection of microprocessors, or a non-dedicated computer loaded with appropriate control software. Lubrication controller 42 receives input signals $C_i$ reflecting states of local assembly 12, and controls motor 16 and actuators of local assembly 12 via output signals $C_o$. Lubrication controller 42 can be a part of local assembly 10, or can be a remote controller that communicates with local assembly 12 via a remote data connection such as a wireless connection. Lubrication controller 42 can include user interface components such as a screen, keypad, and/or communication transceiver to provide data to local or remote users, and accept user input commands. In some embodiments lubrication controller 42 can output alarm or alert messages (e.g. via digital signals, lights, and/or sounds) indicating changes in operation of local assembly 12.

Local assembly 12 supplies lubricant to machine components that can be portable or otherwise mobile away from refill source 28. Lubricant reservoir 14 can be refilled as needed, allowing local assembly 12 to operate independently from lubricant source for extended periods, e.g. while associated machine components are in use at a location remote from refill source 28.

Figure 2:
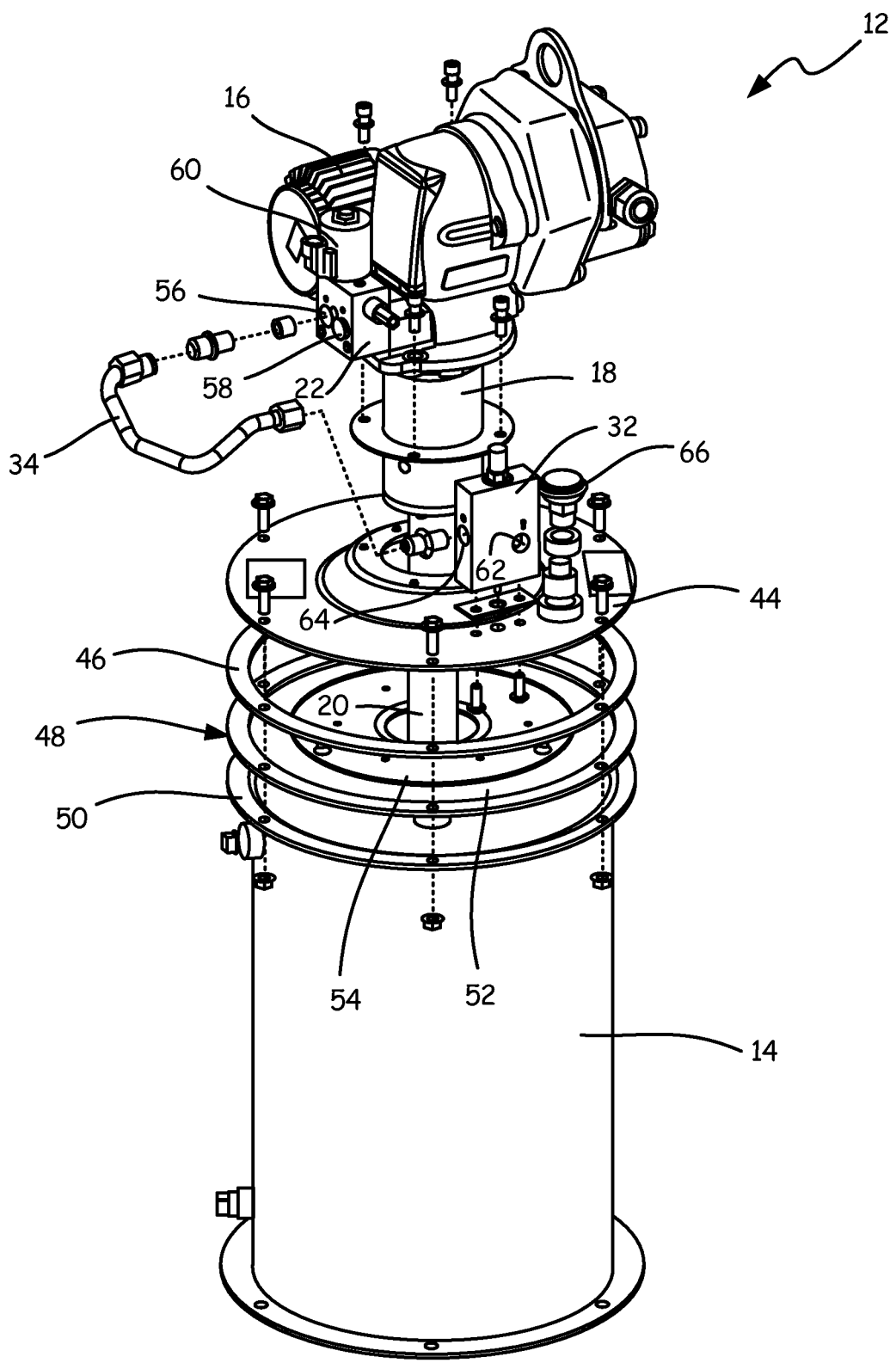
FIG. 2 is an exploded view of a portion of the lubrication system of FIG. 1.

FIG. 2 is an exploded view of a portion of local assembly 12, illustrating lubricant reservoir 14, motor 16, pump 18, fluid tube 20, inlet/output manifold 22, shutoff valve assembly 32, and inlet line 34 as described above. FIG. 2 further depicts cover plate 44, seal ring 46, diaphragm plate 48, reservoir lip 50, flexible diaphragm 52, fill plate 54, main inlet 56, main outlet 58, vent valve solenoid 60, refill inlet 62, refill outlet 64, and air vent 66.

In the depicted embodiment, cover plate 44 is a substantially flat cover to lubricant reservoir 14 that serves as an base for motor 16, pump 18, shutoff valve assembly 32, and air vent 66. In an assembled state, cover plate 44 is bolted to seal ring 46, diaphragm plate 48, and reservoir lip 50. Reservoir lip 50 is an annular flange of lubricant reservoir disposed to receive fasteners and form a fluid seal with diaphragm plate 48. Diaphragm plate 48 and seal ring 46 are disposed between reservoir lip 50 and cover plate 44. In the depicted embodiment, diaphragm plate 48 is a diaphragm plate that includes flexible diaphragm 52 and at least one fill plate 54. When reservoir 14 is not full, the weight of fill plate 54 causes flexible diaphragm 52 to bow downward, away from cover plate 44. As reservoir 14 is filled, lubricant within lubricant reservoir 14 forces flexible diaphragm 52 and fill plate 54 upwards. In some embodiments, this upwards deformation of diaphragm plate 48 can actuate shutoff valve assembly 32, causing shutoff valve assembly 32 to close when lubricant reservoir 14 is full. In alternative embodiments, other kinds of diaphragm plates can be used instead. Air vent 66 is a covered aperture in cover plate 44 that permits airflow beneath diaphragm plate to avoid suction as lubricant levels fall in lubricant reservoir 14. In some embodiments, flexible diaphragm 52 and/or fill plate 54 may include air flow apertures that allow airflow through diaphragm plate 48, but close to obstruct lubricant flow.

As described with respect to FIG. 1, inlet/output manifold 22 is a fluid manifold with fluid passages into/out of fluid tube 20. Main inlet 56 and main outlet 58 are input and output ports of inlet/output manifold 22, respectively. Main outlet 58 connects to lubricant work line 24. In some embodiments, inlet/output manifold 22 can have multiple main outlets servicing multiple lubricant work lines. Main inlet 56 receives refill lubricant from refill source 28 via inlet line 34 and refill line 30. Although inlet line 34 is illustrated as a hose, alternative embodiments of inlet line 34 may for example be rigid tubes or channels. Inlet line 34 connects main inlet 56 to refill outlet 64, and outlet port of shutoff valve assembly 32. Refill lubricant enters shutoff valve assembly 32 at refill inlet 62, exits shutoff valve assembly 32 at refill outlet 64 (if shutoff valve assembly 32 is open), and continues into lubricant reservoir 14 through inlet line 34, main inlet 56, and fluid tube 20.

In the depicted embodiment, inlet/output manifold 22 is equipped with vent valve solenoid 60, an actuator solenoid that drives a vent valve integral to inlet/output manifold 22. Vent valve solenoid 60 actuates valving in inlet/output manifold 22 according to command signals included among output signals $C_o$ from lubrication controller 42. In this way, inlet/output manifold 22 is able to switch between pumping and vent modes. In pumping modes, pump 18 can drive fluid from lubricant reservoir 14 through main outlet(s) 58 to lubricant work line(s) 24, and/or lubricant reservoir 14 can receive pumped refill lubricant from refill source 28, through main inlet 56. In vent modes, pressurized fluid in lubricant work line 24 is allowed to recycle back through inlet passages of inlet manifold 22 into lubricant reservoir 14 as a pressure relief mechanism.

Figure 3A:
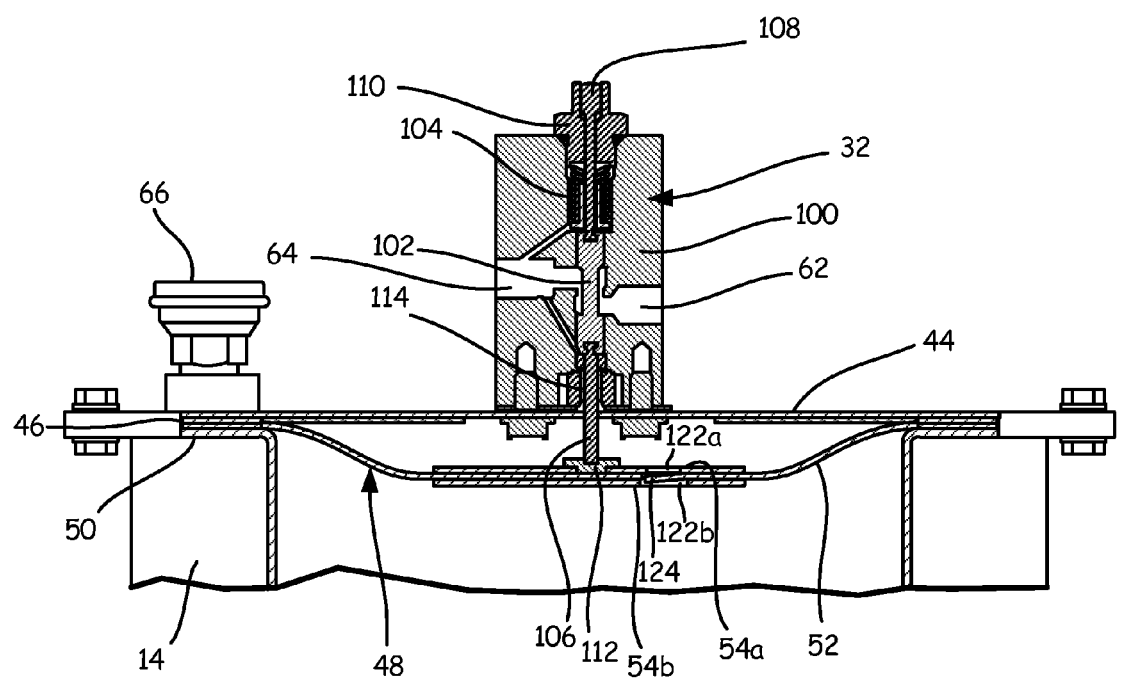
FIG. 3a is a cross-sectional view of a first embodiment of a portion of the lubrication system of FIG. 2, illustrating a shutoff valve assembly.

FIG. 3a is a cross-sectional view of one embodiment of local assembly 12, illustrating a shutoff valve assembly 32 in greater detail. FIG. 3a illustrates lubricant reservoir 14, shutoff valve assembly 32, cover plate 44, seal ring 46, diaphragm plate 48, reservoir lip 50, flexible diaphragm 52, fill plates 54a and 54b, refill inlet 62, refill outlet 64, and air vent 66 as described above with respect to FIG. 2. FIG. 3a further illustrates valve assembly body 100, shutoff valve 102, bias element 104, actuator pin 106, indicator pin 108, cap 110, pin receiver 112, valve seal 114, airflow apertures 122a and 122b, and diaphragm flap 124.

Valve assembly body 100 is a rigid body with a plurality of fluid channels, including refill inlet 62 and refill outlet 64. As discussed with respect to FIGS. 1 and 2, shutoff valve assembly 32 receives lubricant from refill source 28 at refill inlet 62. Some embodiments of shutoff valve assembly 32 may have multiple refill inlets 62 and/or refill outlets 64. When shutoff valve 102 is open, lubricant is free to flow from refill inlet 62 to refill outlet 64, and on through inlet line 34 to inlet/output manifold 22 and lubricant reservoir 14. When shutoff valve 102 is closed, lubricant flow through shutoff valve assembly 32 is cut off. Shutoff valve 102 can, by way of example, be a poppet or shuttle valve biased towards an open state by bias element 104. Bias element 104 can, for example, be a spring retained against cap 110.

Actuator pin 106 drives shutoff valve 102 from an open state to a closed state when lubricant reservoir 14 becomes full. Actuator pin 106 is a rigid rod or shaft extending from shutoff valve 102 to fill plate 54 of diaphragm plate 48. In one embodiment actuator pin 106 is carried on diaphragm plate 48 by pin receiver 118. Other embodiments may do without pin receiver 112, and actuator pin 106 may ride directly on diaphragm plate 48. In Indicator pin 108 is a rigid rod or shaft extending upward from shutoff valve 102 through cap 110, such that a top portion of indicator pin 108 is externally visible. Shutoff valve 102, actuator pin 106, and indicator pin 108 are connected, and move together within valve assembly body 100. In some embodiments actuator pin 106 and indicator pin 108 can be fastened to shutoff valve 102 (e.g. via threading or solder). In other embodiments, actuator pin 106 and/or indicator pin 108 can be formed integrally with shutoff valve 102.

Lubricant can fill most of lubricant reservoir 14 without affecting the position of diaphragm plate 48 or actuator pin 106. Once lubricant fluid from refill source 28 has filled lubricant reservoir 14 up to the bottommost position of fill plate 54, however, additional fluid pushes fill plate 54 of diaphragm plate 48 upward, driving actuator pin 106 upwards as well. This vertical displacement of actuator pin 106 applies force to shutoff valve 102 opposite the biasing force applied by bias element 104, driving shutoff valve 102 towards a closed state wherein no fluid can flow through shutoff valve assembly 32. In this way, shutoff valve assembly 32 provides an entirely mechanical shutoff mechanism actuated by the filling of lubricant reservoir 14.

In addition to retaining bias element 104, cap 110 includes a passage through which indicator pin 108 can pass. When lubricant material in lubricant reservoir 14 forces fill plate 54 and actuator pin 106 upward, indicator pin head 108 emerges from cap 110. This serves as a visual indicator for a human operator, showing at a glance whether lubricant reservoir 14 is completely full.

Fill plates 54a and 54b have respective airflow apertures 122a and 122b that permit airflow into and out of lubricant reservoir 14 through air vent 66 as lubricant levels respectively fall (during pumping) and rise (during refill). In the illustrated embodiment, top airflow aperture 122a through top fill plate 54a has smaller diameter than bottom airflow aperture 122b through bottom fill plate 54b. At the location between airflow apertures 122a and 122b, flexible diaphragm 52 has diaphragm flap 124. Diaphragm flap 124 acts as a check valve, permitting airflow across diaphragm plate 48 but closing in contact with lubricant to prevent lubricant from crossing diaphragm plate 48. Although only one set of airflow apertures 122a and 122b and diaphragm flap 124 is illustrated in FIG. 3a, some embodiments of diaphragm plate 48 may include multiple such airflow locations.

Figure 3B:
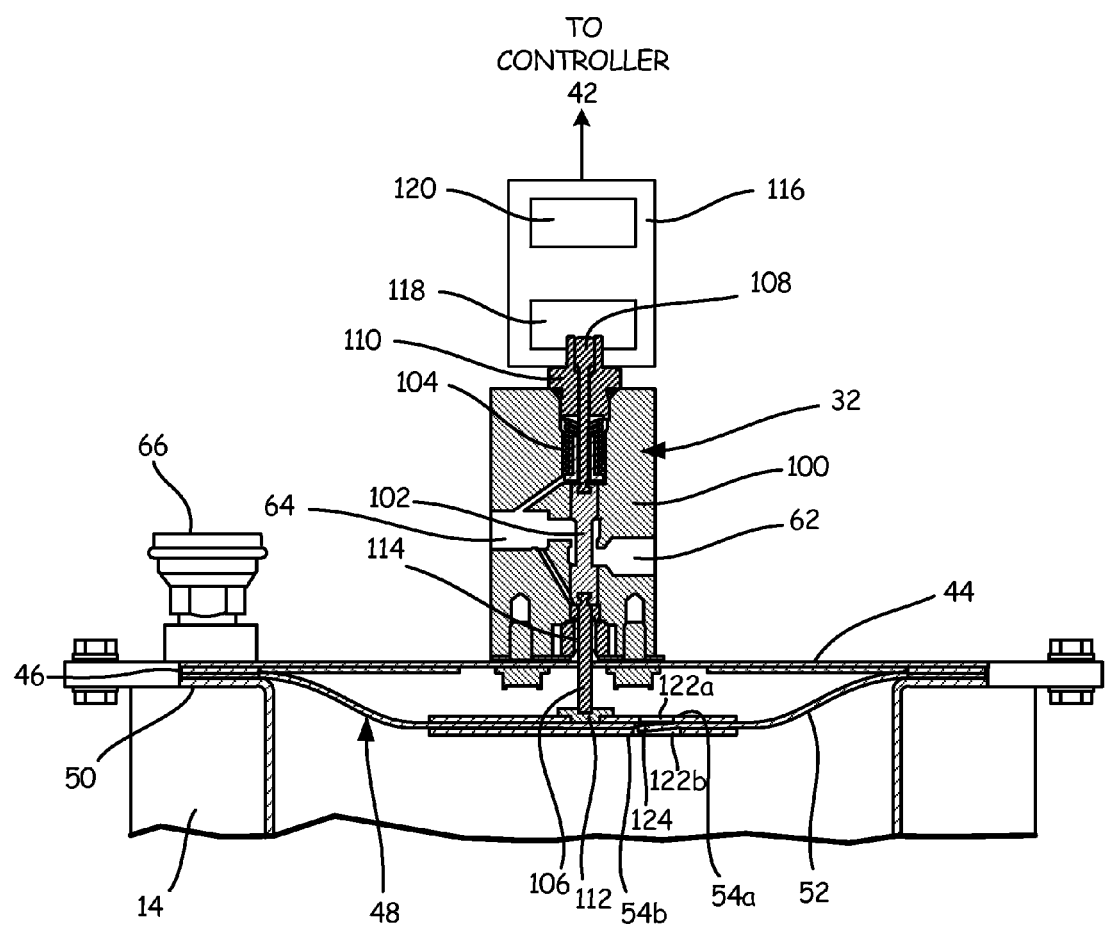
FIG. 3b is a cross-sectional view of a second embodiment of a portion of the lubrication system of FIG. 2, illustrating the shutoff valve assembly.

FIG. 3b is a cross-sectional view of an alternative embodiment of local assembly 12. Local assembly 12 operates entirely as described above with respect to FIG. 3a, but further includes transmitter assembly 116 with sensor 118 and transmitter 120. Transmitter assembly 116 can, for example be a modular assembly affixed to shutoff valve assembly 32. Transmitter assembly 116 sends digital signals (e.g. to lubrication controller 42) indicating the state of shutoff valve 102 based on the location of indicator pin 108. Sensor 118 senses when shutoff indicator pin 108 translates vertically from a first "down" position corresponding to an open state of shutoff valve 102 to a second "up" location corresponding to a closed state of shutoff valve 102. Transmitter 120 transmits a data signal indicating this valve state. Sensor 118 can for example be a reed switch actuated by movement of indicator pin 108, or an electromagnetic sensor that senses the relative location of indicator pin 108. Transmitter 120 can be wireless or wired transmitter, and can communicate with lubrication controller 42, or with other control equipment or devices. Some embodiments of transmitter assembly 116 can obscure actuator pin head 108, preventing it from serving as a visual indicator for a human user.

Figure 4A:
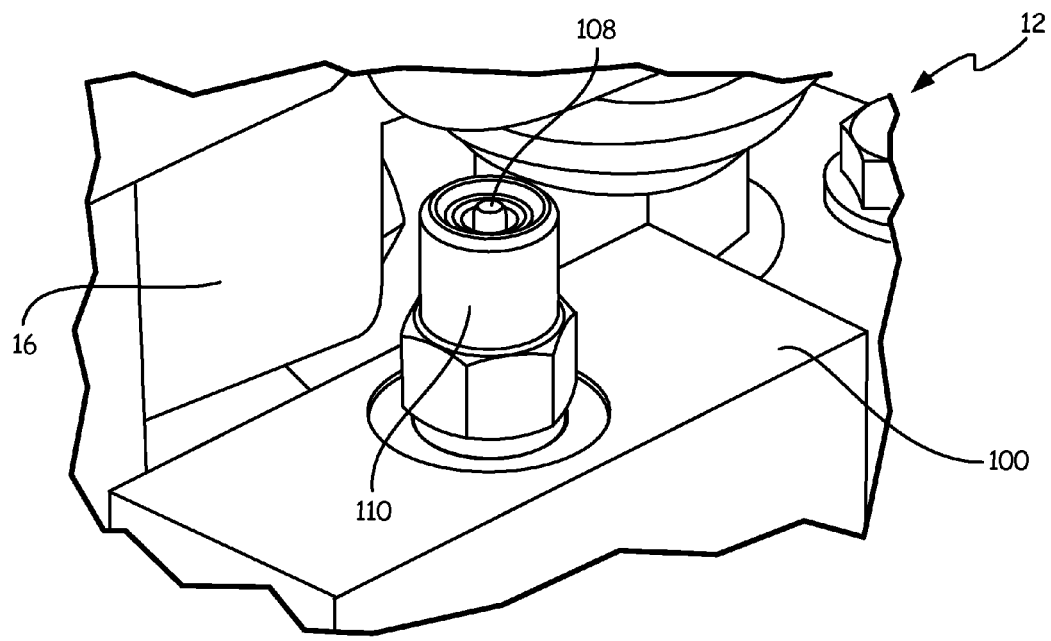
FIGS. 4a and 4b are perspective views of the shutoff valve assembly of FIG. 3a, illustrating open and shutoff states of the shutoff valve assembly.
Figure 4B:
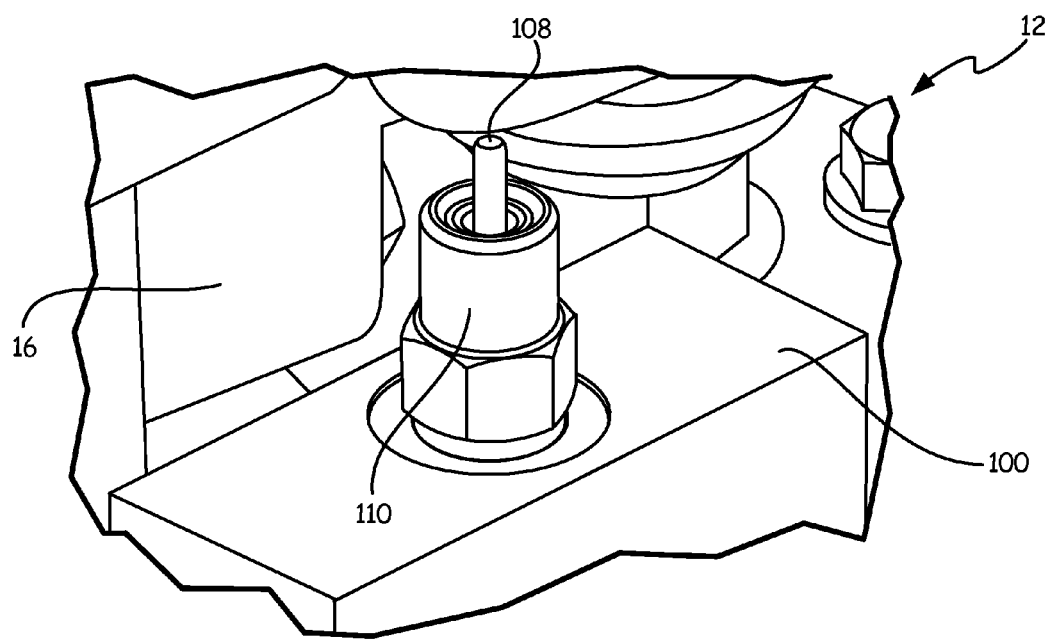

FIGS. 4a and 4b are perspective views of local assembly 1 illustrating "up" and "down" states of indicator pin 108, as described above with respect to FIG. 3a. FIGS. 4a and 4b show local assembly 12, motor 16, valve assembly body 100, indicator pin 108, and cap 110. FIG. 4a depicts a "down" state of indicator pin 108 corresponding to shutoff valve 102 being open. FIG. 4b depicts an "up" state of indicator pin 108 corresponding to shutoff valve 102 being closed. The position of indicator pin 108 serves as a visual indicator that allows a human user to tell at a glance whether lubricant reservoir 14 is full.

As illustrated in FIGS. 3a, 3b, 4a, and 4b, shutoff valve assembly 32 passively closes shutoff valve 102 in response to lubricant reaching the top of lubricant reservoir 14. Shutoff valve assembly 32 also provides an indication of fill state, either as a visual indicator provided by the position of indicator pin 108, or as a data signal transmitted by transmitter assembly 116.

Discussion of Possible Embodiments

The following are non-exclusive descriptions of possible embodiments of the present invention.

A lubrication system comprising: a lubricant reservoir; an inlet into the lubricant reservoir; a diaphragm plate disposed at a topmost location within the lubricant reservoir; an actuator pin coupled to the diaphragm plate such that filling the lubricant reservoir forces the diaphragm plate upward, driving the actuator pin from a first position corresponding to an unfilled reservoir state to a second position corresponding to a filled reservoir state; and a refill inlet configured to receive lubricant; a refill outlet fluidly connected to the inlet of the lubricant reservoir; and a shutoff valve connected between the refill inlet and the refill outlet, and actuated by the actuator pin so as to fluidly connect the refill inlet and refill outlet when the actuator pin is in the first position, and fluidly isolate the refill inlet from the refill outlet when the actuator pin is in the second position.

The lubrication system of the preceding paragraph can optionally include, additionally and/or alternatively, any one or more of the following features, configurations and/or additional components:

A further embodiment of the foregoing lubrication system, wherein the actuator pin is biased to the first position.

A further embodiment of the foregoing lubrication system, further comprising an indicator pin coupled to the shutoff valve and capable of serving as a visual indicator of a fill state of the lubricant reservoir.

A further embodiment of the foregoing lubrication system, wherein the indicator pin extends away from the shutoff valve while in the second position, but not while in the first position.

A further embodiment of the foregoing lubrication system, wherein the shutoff valve is a poppet valve.

A further embodiment of the foregoing lubrication system, further comprising a fluid manifold disposed between the shutoff valve and the lubricant reservoir.

A further embodiment of the foregoing lubrication system, further comprising a refill system comprising: a refill reservoir; a fill line connectable from the refill reservoir to the refill inlet; and a pump disposed at the refill reservoir to pump lubricant from the refill reservoir, through the fill line, to the refill inlet.

A further embodiment of the foregoing lubrication system, wherein the diaphragm plate further comprises an airflow aperture with a diaphragm flat that acts as a check valve, permitting airflow but preventing lubricant flow across the diaphragm.

A further embodiment of the foregoing lubrication system, wherein the diaphragm plate comprises two substantially rigid plates supported by a flexible membrane extending across a top portion of the lubrication reservoir.

An inlet shutoff assembly for a lubrication reservoir, the shutoff assembly comprising: a diaphragm plate disposed at a topmost location within the lubricant reservoir; an actuator pin coupled to the diaphragm plate such that filling the lubricant reservoir forces the diaphragm plate upward, driving the actuator pin from a first position corresponding to an unfilled reservoir state to a second position corresponding to a filled reservoir state; a inlet shutoff valve actuated by the actuator pin so as to be open when the actuator pin is in the first position to allow flow to the lubricant reservoir, and closed when the actuator pin is in the second position to prevent flow; and an indicator pin visible when the actuator pin is in the second position, but hidden when the actuator pin is in the first position.

The inlet shutoff assembly of the preceding paragraph can optionally include, additionally and/or alternatively, any one or more of the following features, configurations and/or additional components:

A further embodiment of the foregoing inlet shutoff assembly, wherein the inlet shutoff valve is a poppet valve.

A further embodiment of the foregoing inlet shutoff assembly, wherein the inlet shutoff valve is biased towards an open state.

A further embodiment of the foregoing inlet shutoff assembly, wherein the indicator pin extends away from the shutoff valve when the actuator pin is in the second position, but is retracted when the shutoff valve is in the first position.

A further embodiment of the foregoing inlet shutoff assembly, further comprising: a sensor disposed to produce a fill state signal indicating whether the actuator pin is in the first or second position; and a transmitter disposed to transmit the fill signal to a controller.

A further embodiment of the foregoing inlet shutoff assembly, further comprising a refill inlet hookup disposed to receive a detachable refill line from a refill reservoir.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lubrication system comprising:
    a lubricant reservoir;
    an inlet into the lubricant reservoir;
    a diaphragm plate disposed at a topmost location within the lubricant reservoir;
    an actuator pin coupled to the diaphragm plate such that filling the lubricant reservoir forces the diaphragm plate upward, driving the actuator pin from a first position corresponding to an unfilled reservoir state to a second position corresponding to a filled reservoir state; and
    a refill inlet configured to receive lubricant;
    a refill outlet fluidly connected to the inlet of the lubricant reservoir; and
    a shutoff valve connected between the refill inlet and the refill outlet, and actuated by the actuator pin so as to fluidly connect the refill inlet and refill outlet when the actuator pin is in the first position, and fluidly isolate the refill inlet from the refill outlet when the actuator pin is in the second position.

2. The lubrication system of claim 1, wherein the actuator pin is biased to the first position.

3. The lubrication system of claim 1, further comprising an indicator pin coupled to the shutoff valve and capable of serving as a visual indicator of a fill state of the lubricant reservoir.

4. The lubrication system of claim 3, wherein the indicator pin extends away from the shutoff valve while in the second position, but not while in the first position.

5. The lubrication system of claim 1, wherein the shutoff valve is a poppet valve.

6. The lubrication system of claim 1, further comprising a fluid manifold disposed between the shutoff valve and the lubricant reservoir.

7. The lubrication system of claim 1, further comprising a refill system comprising:
    a refill reservoir;
    a fill line connectable from the refill reservoir to the refill inlet; and
    a pump disposed at the refill reservoir to pump lubricant from the refill reservoir, through the fill line, to the refill inlet.

8. The lubrication system of claim 7, wherein the diaphragm plate further comprises an airflow aperture with a diaphragm flat that acts as a check valve, permitting airflow but preventing lubricant flow across the diaphragm.

9. The lubrication system of claim 1, wherein the diaphragm plate comprises two substantially rigid plates supported by a flexible membrane extending across a top portion of the lubrication reservoir.

10. An inlet shutoff assembly for a lubrication reservoir, the shutoff assembly comprising:
    a diaphragm plate disposed at a topmost location within the lubricant reservoir;
    an actuator pin coupled to the diaphragm plate such that filling the lubricant reservoir forces the diaphragm plate upward, driving the actuator pin from a first position corresponding to an unfilled reservoir state to a second position corresponding to a filled reservoir state;
    a inlet shutoff valve actuated by the actuator pin so as to be open when the actuator pin is in the first position to allow flow to the lubricant reservoir, and closed when the actuator pin is in the second position to prevent flow; and
    an indicator pin visible when the actuator pin is in the second position, but hidden when the actuator pin is in the first position.

11. The inlet shutoff assembly of claim 10, wherein the inlet shutoff valve is a poppet valve.

12. The inlet shutoff assembly of claim 10, wherein the inlet shutoff valve is biased towards an open state.

13. The inlet shutoff assembly of claim 10, wherein the indicator pin extends away from the shutoff valve when the actuator pin is in the second position, but is retracted when the shutoff valve is in the first position.

14. The inlet shutoff assembly of claim 10, further comprising:
 a sensor disposed to produce a fill state signal indicating whether the actuator pin is in the first or second position; and
 a transmitter disposed to transmit the fill signal to a controller.

15. The inlet shutoff assembly of claim 10, further comprising a refill inlet hookup disposed to receive a detachable refill line from a refill reservoir.

\* \* \* \* \*